(12) United States Patent
Dodson

(10) Patent No.: US 9,295,223 B2
(45) Date of Patent: Mar. 29, 2016

(54) HOLDER FOR PET LEASH

(71) Applicant: David Dodson, Muncie, IN (US)

(72) Inventor: David Dodson, Muncie, IN (US)

(*) Notice: Subject to any disclaimer, the term of this patent is extended or adjusted under 35 U.S.C. 154(b) by 0 days.

(21) Appl. No.: 14/023,100

(22) Filed: Sep. 10, 2013

(65) Prior Publication Data

US 2015/0067991 A1  Mar. 12, 2015

(51) Int. Cl.
*A47B 96/00* (2006.01)
*A01K 1/04* (2006.01)
*A01K 1/035* (2006.01)

(52) U.S. Cl.
CPC . *A01K 1/04* (2013.01); *A01K 1/035* (2013.01); *Y10T 24/32* (2015.01); *Y10T 24/33* (2015.01); *Y10T 24/45* (2015.01)

(58) Field of Classification Search
CPC .......... A01K 1/04; A01K 1/035; Y10T 24/32; Y10T 24/33; Y10T 24/45
USPC .............. 248/126, 201, 309.1, 176.1, 223.41, 248/224.7, 297, 51, 310; 119/771, 791, 793
See application file for complete search history.

(56) References Cited

U.S. PATENT DOCUMENTS

| | | | | |
|---|---|---|---|---|
| 606,922 | A * | 7/1898 | Gates | 119/783 |
| 3,294,247 | A * | 12/1966 | Norrington | 211/64 |
| 6,318,302 | B1 * | 11/2001 | Bedient | 119/786 |
| 6,820,573 | B1 * | 11/2004 | McMullin | 119/791 |
| 7,028,641 | B1 * | 4/2006 | Martin | 119/791 |
| 8,307,789 | B2 * | 11/2012 | Stuerke | 119/791 |
| 2006/0081196 | A1 * | 4/2006 | Kirch et al. | 119/769 |

* cited by examiner

*Primary Examiner* — Gwendolyn Baxter
(74) *Attorney, Agent, or Firm* — Jacque R. Wilson; Carson Boxberger LLP

(57) ABSTRACT

A holder for selectively securing the handle of a pet leash to a door frame for a home, mobile home, manufactured home, boat house or RV, comprising a component attached to a door frame and a second component releasably attached to the first component.

1 Claim, 2 Drawing Sheets

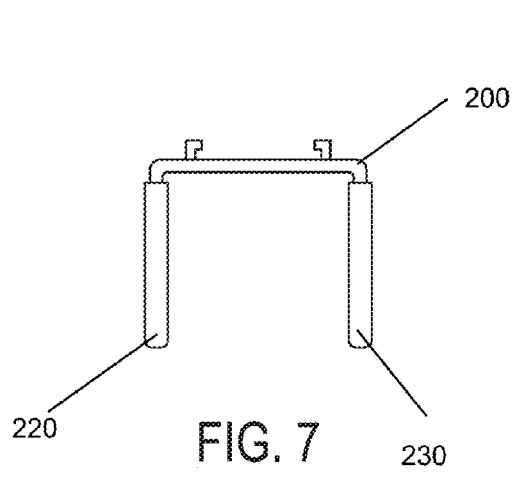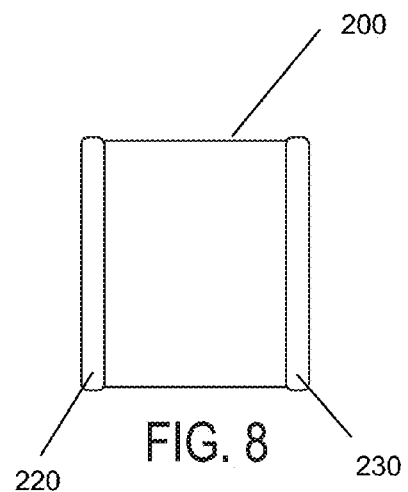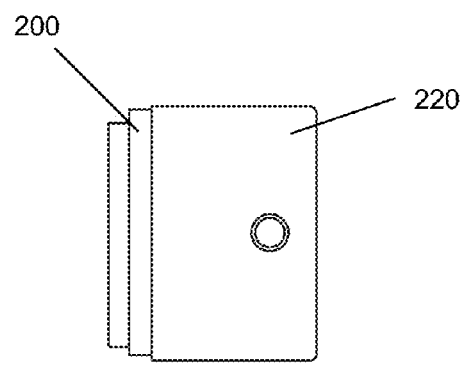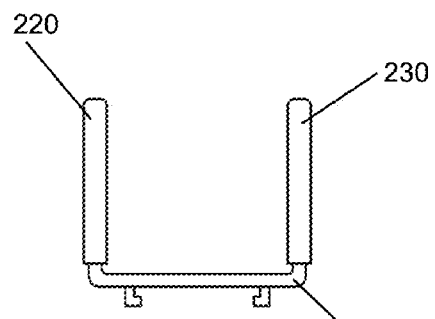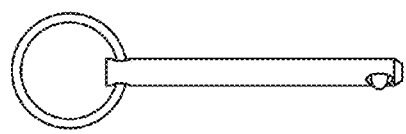

HOLDER FOR PET LEASH

REFERENCE TO RELATED APPLICATIONS

This application claims priority from U.S. provisional patent application Ser. No. 61/795,953 filed Oct. 31, 2012 which provisional application is hereby incorporated by reference into the present application for letters patent.

BACKGROUND

1. Field of the Art

The present invention is generally related to pet leashes. More specifically the present invention is related to devices to which handles of retractable pet leashes may be attached.

2. Description of the Prior Art

U.S. Pat. No. 4,762,089 (the "'089 patent") discloses a horse grooming stall utilizing tether devices on opposite side walls, each tether device having a spring-biased spool for controlling withdrawal and retraction of a retaining strap. A horse is groomed by latching the straps of the tether devices to opposite sides of the horse's harness to hold it essentially stationary during grooming without risk of injury.

U.S. Pat. No. 4,862,833 (the "'833 patent") discloses an animal tether device having a plurality of upright post members embedded in the ground interconnected by at least one fence member with a rail member mounted on the post members a distance above the ground, such rail member having a carriage member moveably contained therein with a leash member extending therefrom attached to the animal and fence extension members disposed at each end of said plurality of post members extending from beneath the level of the rail member and curving downward at an angle to the ground to prevent the animal from going around the end posts of the series of posts too sharply so as to prevent tangling of the leash pulling the carriage moving within the rail member.

U.S. Pat. No. 5,339,773 (the "'773 patent") discloses a semi-permanent apparatus and a method for tethering and restraining grazing animals, house pets and security dogs comprising a moveable trolley mounted on a track attached to a solid surface, such as the ground. One end of a tether is attached to the animal and the other end of the tether is attached to the trolley. The trolley moves along the track when the animal tugs at the tether, but the track, trolley and tether prevent the animal from roaming to a distance from the track beyond the length of the tether.

U.S. Pat. No. 5,497,732 (the "'732 patent") discloses a portable dog run for exercising an animal. A cable, wound around a spool, provides an overhead linear guideway when extended. Also, a spool lock is provided to affix the cable at a predetermined length. The spool and extended cable connect to various fixtures by using swivel snaps and eyebolts, or other similar connectors. Adjustable straps are provided to connect the dog run to structures which do not accommodate eyebolts, hence enhancing the portability.

U.S. Pat. No. 6,318,302 (the "'302 patent") discloses a rotating retractable leash support including a base with a vertical support and a rotatable bracket arm attached to the upper end. A retractable leash is releasably attached to the bracket arm with the free end of the leash extending out through an eyelet at the distal end thereof. The eyelet is generally horizontally aligned with the leash at the level where it extends from the housing and provides a lever arm to facilitate the rotation of the bracket arm in the direction of the animal as it moves around the vertical support. The retractable leash is releasably attached to the bracket arm by a pin that extends through the closed loop that defines the hand grip.

U.S. Pat. No. 7,266,937 (the "'937 patent") discloses a retractable safety horse tying apparatus having a housing which is shaped to receive a spring-loaded reel that rotates about a center spindle. A tether rope or other material is wound around the reel and anchored there and the opposite end threaded through a hole on the housing and attached to fusible link and fed onto the exterior of the reel. A spring is mounted internally of the reel and attaches to the reel. A fusible link is mounted on the outside of housing such that the fusible link permits rope to be played out from the reel in response to pressure applied to the rope. The fusible link permits the rope to be pulled out from a position straight in front of the device and also from an angle. This permits the tether rope to be automatically fed out in response to anxious pulling by a tethered horse, or other animal. The spring-loaded reel, compressed when the tether rope is being played out, automatically retracts the tether rope in response to the spring loosening as a result of the frightened animal calming.

U.S. Pat. No. 7,404,535 (the "'535 patent") discloses a video monitor mount having a first piece adapted to be fastened to a wall and a second piece adapted to be fastened to a video monitor. The first piece includes a bubble level and a first mating component and the second piece includes a second mating component. The first piece or the second piece comprises an extension arm having a rotation joint that comprises a brass bushing.

U.S. Pat. No. 7,467,604 (the "'604 patent") discloses a hand free dog leash which enables a person to walk his/her dog without having to hold the leash. The device includes a pulley which rides on a flexible waist cord which in turn is attached by swivels to a waist belt to permit the dog to move side to side without unbalancing the person. The leash also includes a leash handle and a quick release mechanism to release the dog from the pulley and waist belt in the event of an emergency. The leash has a flexible coil and hook assembly to prevent the leash from abruptly pulling on the dog's collar and neck and also provides flexibility to permit the dog to move without unbalancing the person.

U.S. patent application publication number 20050229867 (the "'867 publication") discloses a double belt has an outer narrow belt completely encircling and extending over and attached to the ends of an inner wider belt. The outer belt adjustably attaches to a quick release buckle at the ends to create an adjustable inner belt attachable to a body of a user or tree or other object. The outer belt has another quick release buckle in the portion overlapping the inner belt. A fabric loop with two metal rings encircles the outer belt and attaches through the end loop or handle of any leash to ride on the rings around the outer belt.

U.S. patent application publication number 20100314480 (the "'480 publication") discloses a security line designation apparatus including a housing that has a top wall, a bottom wall and a perimeter wall being attached to and extending between the top and bottom walls. A spindle is rotatably mounted within the housing. An elongated flexible panel is attached to the spindle. The panel extends through an aperture in the perimeter wall and the panel has a free end positioned outside of the housing. The spindle is rotationally biased in a first direction. The panel is wound onto the spindle when the spindle is rotated in the first direction. The panel has indicia thereon indicating persons are to remain away from an area bordered by the panel. A biasing member biases rotation of the spindle in the first direction. A coupler releasably couples the free end to the housing.

U.S. patent application publication number 20110198878 (the "'878 publication") discloses a mobile electrified fence enclosure system utilizing multiple movable storable fence posts and flexible electrified ribbons what are retractably reeled into a spool. The electrified ribbons are detachably connected electrically by means of a breakaway connector which interrupts the voltage should the animal bolt through the wiring. The system is preferably stored in or attached to a trailer, such as a horse trailer, and is quickly and easily set-up and taken-down.

U.S. patent application publication number 20130001386 (the "'386 publication") discloses a mailbox slider device that provides mailboxes of various widths to be slideably mounted along the horizontal portion of an existing mailbox support post. The device comprises a first base member and a second slideable member being attached using complimentary tongue and groove sliders, wherein the members include a recessed channel having a first and second channel stop that prevents separation of the two members at the base member distal end, while allowing separation and engagement of the members along the inward proximal end of the base member. A mailbox is secured to a support block, which then attaches to the upper surface of the second sliding member. The sliding member engages the base member from its proximal end. The base member is secured to the horizontal portion of a mailbox post to provide a readily extendable and retractable assembly for improved access for postal service workers.

The known prior art, however, does not disclose a system for safely, securely, easily, and inexpensively tethering a pet to the door frame of a RV or home for the purpose of allowing a pet to be outside for exercise or other purposes.

SUMMARY

Unlike the prior art, the present invention provides a holder for selectively securing the handle of a pet leash to a door frame for a home, mobile home, manufactured home, boat house or RV, wherein the holder is comprised of a first component fixedly attached to a door frame; a second component releasably attached to said first component, where the second component is comprised of a base and a pair of opposed plates protruding from opposite sides of said base. Additionally, each of the plates of the holder comprises a bore having a longitudinal axis, where the bores are oriented such that they face one another and such that the longitudinal axis of each bore is collinear with the longitudinal axis of the opposing bore. The holder of the present invention further comprises a rod, selectively disposed through said bores between said plates.

In this way, the present invention, unlike the prior art devices discussed herein, allows a pet to remain outside without the pet being directly held by its owner. Instead, the pet owner can selectively attach the present invention to a door frame and then selectively attach the handle portion of a pet leash to the present invention.

Further advantages of the present invention will be understood upon a careful review of the drawings and detailed description herein.

BRIEF DESCRIPTION OF THE DRAWINGS

FIG. 7 shows a top view of a second component of a pet leash holder according to an embodiment of the present invention.

FIG. 8 shows a front view of a second component of a pet leash holder according to an embodiment of the present invention.

FIG. 9 shows a side view of a second component of a pet leash holder according to an embodiment of the present invention.

FIG. 10 shows a bottom view of a second component of a pet leash holder according to an embodiment of the present invention.

FIG. 11 shows a side view of a rod according to the present invention.

DETAILED DESCRIPTION OF THE EMBODIMENTS

Figure 1:
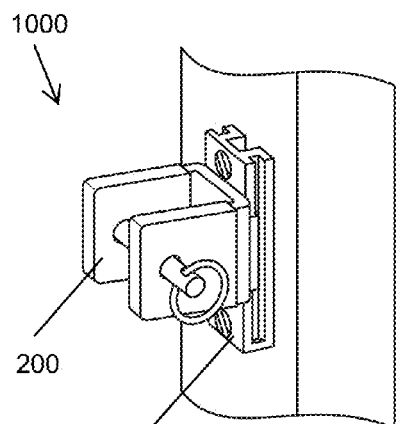
FIG. 1 shows a perspective view of a pet leash holder according to an embodiment of the present invention used with a common retractable pet leash.
Figure 2:
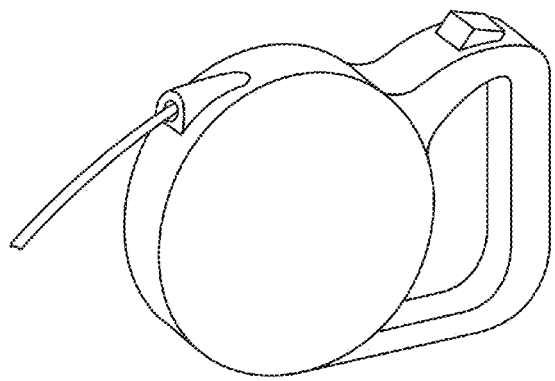
FIG. 2 shows a perspective view of a common retractable pet leash handle.

Referring first to FIG. 1, there is shown a perspective view of a pet leash holder 1000 according to an embodiment of the present invention. Holder 1000 may be used with a common prior art retractable pet leash, specifically a FLEXi® retractable pet leash (FIG. 2) sold by Ace Hardware, Inc.

Referring again to FIG. 1, holder 1000 comprises first component 100 having means for securely affixing component 100 to a rigid device. In one preferred embodiment, component 100 is attached to a door frame for a house, manufactured home, cottage, or recreational vehicle ("RV"). Referring still to FIG. 1, holder 1000 further comprises second component 200 releasably attached to first component 100 and adapted to be releasably attached to the handle of a common pet leash. Both component 100 and component 200 are described in greater detail below.

Figure 3:
FIG. 3 shows a top view of a first component of a pet leash holder according to an embodiment of the present invention.

Referring now to FIG. 3, there is shown a top view of a component 100 of pet leash holder 1000. Holder 1000 should comprise a relatively inexpensive yet durable material that will not degrade while exposed to outside weather conditions. Suitable materials include metals, such as stainless steel and aluminum, plastics, thermosets, rubbers, and composite materials. In one preferred embodiment, component 100 of holder 1000 is comprised of extruded aluminum.

Figure 5:
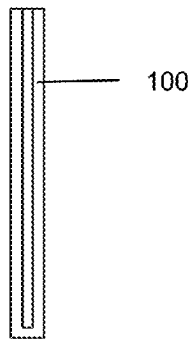
FIG. 5 shows a side view of a first component of a pet leash holder according to an embodiment of the present invention.

Referring still to FIG. 3, component 100 of holder 1000 comprises a generally rectangular shape (FIG. 5) and means for attaching component 100 to a rigid body such as a door frame. In one exemplary embodiment, such means for attachment includes one or more bores 110 and 120 through component 100. The bores 110 and 120 are suitable for fasteners to attach component 100 to a door frame. The fasteners (not shown) may comprise bolts, nails, screws, or the like to allow component 100 to be securely, but, preferably, releasably, attached to a rigid body. Alternatively, component 100 may be attached to a rigid body using an adhesive.

As discussed in reference to FIG. 1, component 100 is adapted to be releasably connected to component 200 as shown in FIG. 1. Thus, component 100 comprises means for releasably attaching component 100 to component 200.

In one preferred embodiment, shown in FIG. 1, the means for releasably attaching component 100 to component 200 comprises a cooperating tongue and groove connection between component 100 and component 200.

Figure 4:
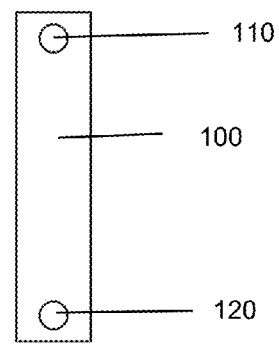
FIG. 4 shows a front view of a first component of a pet leash holder according to an embodiment of the present invention.

Returning to FIG. 4, holder 1000 includes means for preventing component 100 and component 200 from sliding completely apart. It will be understood by those of skill in the art that stopping means may include a raised fastener, a protrusion along the channel of component 100 or a protrusion from either or both of grooves.

Moreover, those of skill in the art will appreciate that a sliding connection is only one means of releasably connecting component 100 and component 200. Other releasable connection means include a snap-fit connection, a screw connection, an adhesive connection, and a bolted connection.

It should also be understood by those of skill in the art that the two piece configuration of the present invention is the preferred design. However, holder 1000 of the present invention can, in other exemplary embodiments, comprise a single unit releasably or securely mounted to a rigid body, such as a door frame using means including screws, bolts, snap fit, tongue and groove, external clips, or adhesives.

Figure 6:
FIG. 6 shows a bottom view of a first component of a pet leash holder according to an embodiment of the present invention.

In FIG. 6, there is shown a bottom view of component 100 of holder 1000. As shown in FIG. 6, the bottom of component 100 is generally smooth and flat so that it may rest evenly against a door frame or other flat rigid object.

Turning now to FIG. 7, there is shown a top view of second component 200 of holder 1000. Component 200 may comprise an elongated connecting portion having a pair of tabs on opposing sides adapted to slidingly engage with cooperating grooves on component 100 so that component 200 can be releasably connected to component 100.

Referring again to FIG. 7, component 200 further comprises flat base 210 having opposing side plates 220 and 2320 which extend upward from base 210. Preferably, base 210 and side plates 220 and 230 are formed from a single piece. As with component 100, component 200 is preferably comprised of aluminum. However, those of skill in the art will appreciate that any sufficiently strong and corrosion resistant material will work, including plastics, thermosets, rubbers, and other metals, such as, stainless steel.

While not shown in the Figures, it is preferable to cover side plates 220 and 230 with a layer of plastic, rubber, or cloth to diminish the wear on any handle or leash used in connection with holder 1000.

Referring now to FIG. 7, FIG. 8, where there is shown a front view of component 200 of holder 1000, FIG. 9 (where there is shown a side view of component 200), and FIG. 10 (where there is shown a bottom view of component 200), opposing, parallel, side plates 220 and 230 each comprise a horizontally disposed bore. Plate 220 comprises bore 225, and plate 230 comprises bore 235. Bores 225 and 235 are arranged on their respective plates 220 and 230 such that bores 225 and 235 oppose one another and have collinear longitudinal axis.

Referring to FIG. 1, component 200 may comprise an elongated connecting portion having grooves on opposing sides. Grooves are adapted to slidingly engage with tabs of component 100 so that component 200 can be releasably connected to component 100.

Turning now to FIG. 11, there is shown rod 300. Rod 300 is elongated with opposing first and second ends. In one exemplary embodiment, rod 300 comprises handle 310 at a first end and collapsible protrusion 320 at a second end.

As shown in FIG. 1, rod 300 is inserted through bores 225 and 235 to provide a means for selectively, removably securing a handle for a retractable pet leash to holder 1000.

It should be understood that the above description is of a preferred embodiment, and it is included for illustrative purposes only, and it is not meant to be limiting of the invention. A person skilled in the art will understand that variations of this invention are included within the scope of the claims.

The invention claimed is:

1. A pet leash holder for selectively securing a pet to a door frame, said holder comprising: a first component fixedly attached to the door frame; a second component slidingly, releasably attached to said first component, said second component comprising a base and a pair of opposed plates protruding from opposite sides of said base, wherein each of said plates comprises a bore having a longitudinal axis, said bores oriented such that they face one another and such that the longitudinal axis of each bore is collinear with the longitudinal axis of the opposing bore, and wherein the opposing plates are covered by an outer protective layer, said outer layer comprising a material selected from the group consisting of plastic, rubber, and cloth; and a rod, said rod selectively disposed through said bores between said plates, wherein the rod has a first end and a second end, and wherein the second end comprises a collapsible detent; said holder further comprising a pet leash holder having a handle having a loop and a cordage member, where said rod is disposed through said loop to secure said handle to said second component.

* * * * *